Dec. 1, 1970 G. B. FORD 3,544,154
DUMP TRUCK SPREADER CHAIN MOUNTING
Filed July 26, 1968 2 Sheets-Sheet 1

INVENTOR
Gailerd B. Ford
BY
Woodard, Weikart, Emhardt & Naughton
Attorneys

INVENTOR
Gailerd B. Ford
BY
Woodard, Weikart, Emhardt & Naughton
Attorneys

United States Patent Office 3,544,154
Patented Dec. 1, 1970

3,544,154
DUMP TRUCK SPREADER CHAIN MOUNTING
Gailerd B. Ford, R.R. 2, Ford Road,
Zionsville, Ind. 46077
Filed July 26, 1968, Ser. No. 747,872
Int. Cl. B62d 25/00
U.S. Cl. 296—56                 7 Claims

ABSTRACT OF THE DISCLOSURE

A dump body has chain holders projecting backwardly therefrom at each side of the tail gate just above the lower margin of the tail gate. The chain holders have downwardly inclined slots with large upper ends to freely receive chain therethrough, the lower portions being narrow to prevent free passage of the chain therethrough transverse to the plane of the holders. Each holder has a pivotally mounted rear plate portion forming the rear margin of the slot and pivotable outward upon release of a lock pin to release a chain even when under load by a tail gate opened for spreading.

BACKGROUND OF THE INVENTION

Field of the invention

This invention relates generally to vehicles with tail gates adapted to spreading material during the dumping of a tiltable body, and more particularly to means for holding a spreader chain but accommodating easy release thereof, when desired.

Description of the prior art

A well known practice with trucks having dump bodies is to have a tail gate which is releasable at the lower margin thereof to dump the contents under the tail gate. By employing spreader chains, the amount of opening of the lower margin of the tail gate can be limited to limit the rate of discharge of contents of the dump body and facilitate the spreading operation. By use of appropriate chain holders, the amount of gate opening upon dumping can be determined by which of the chain links is placed in the holder.

Typical chain holders or supports have been in the form of an opening in the right and left rear corner posts of the dump body, the upper end of the opening being large to admit the chain readily, and the lower portion being narrow to enable retention of the chain by preventing passage of links therethrough transverse to the plane of the apertured post face. One problem with such an arrangement is the tendency of the apertures to become filled with dirt, making it difficult or impossible to get the chain into the opening. Another problem is the difficulty of releasing the chain in the event that material being dumped becomes wedged in the opening between the lower edge of the dump body and the lower edge of the tail gate. In that event, even if the dump body is lowered to permit freeing of the wedged material, sometimes it is quite difficult to do so and the load on the chain remains, so that it is impossible to remove the chain from the holder. Chain holders projecting from the rear of the dump body are known and, while resistant to the clogging problem, are nevertheless subject to the binding problem.

The result of the aforementioned problems is that in addition to general inconvenience, a great deal of time can be wasted in truck operation, together with the losses usually associated with waste of time. The present invention is directed toward solving these problems.

SUMMARY OF THE INVENTION

Described briefly, in a typical embodiment of the present invention, chain holders are mounted to the rear of the dump body at both sides of the tail gate. Each of the chain holders has a part welded to the rear of the dump body, and a second part pivotally mounted thereto, the two parts cooperating to provide a downwardly extending slot with a large aperture at the top permitting free passage of a spreader chain therethrough. The lower portion of the slot is narrow to prevent free passage of the spreader chain therethrough, but admit any link of the chain to facilitate location thereof at the desired link for providing the desired tail gate opening upon tilting of the dump body.

A release pin is provided in the rear portion of each holder and, upon removal of the release pin, the rear portion can be pivoted to open up the slot and free the chain, even if the chain is loaded. Upon return of the rear plate and replacement of the pin, the holder is restored to its normal condition for use with the spreader chain as desired.

BRIEF DESCRIPTION OF THE DRAWINGS

The full nature of the invention will be understood from the accompanying drawings and the following description and claims.

DESCRIPTION OF THE PREFERRED EMBODIMENTS

Figure 1:
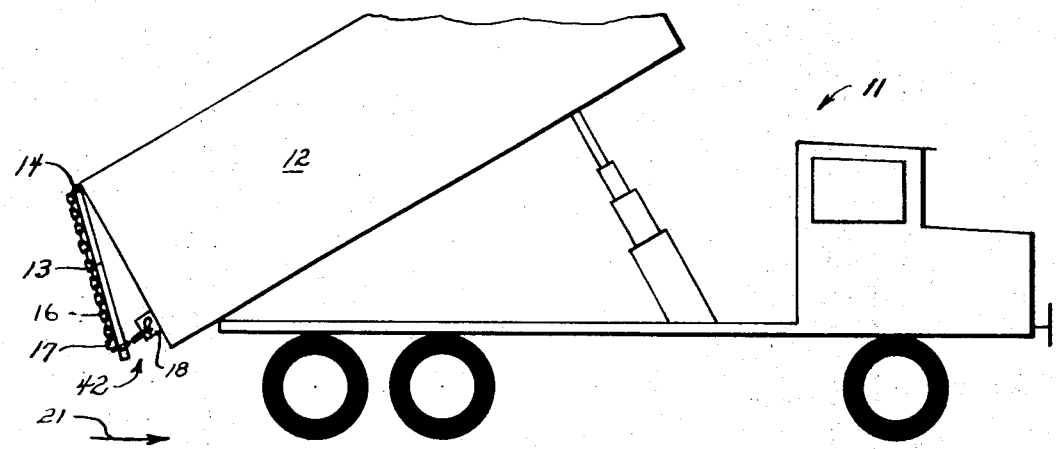
FIG. 1 is a schematic side elevational view of a dump truck with the dump body tilted upwardly and the tail gate opening controlled by a spreader chain.

Referring now to the drawings in detail, FIG. 1 shows the truck 11 with the body 12 thereof tipped upwardly for dumping the contents through the tail gate 13, the latter being pivotally mounted to the bed at 14. A chain 16 connected to the tail gate adjacent the pivot 14, passes downwardly through the loop 17 in the rear of the tail gate and then forwardly through the chain holder assembly 18 and is locked therein to prevent the tail gate from opening any farther than shown. In this way, the rate of discharge of the contents of the bed can be controlled as desired for spreading the load during forward motion of the truck in the direction of arrow 21.

Figure 2:
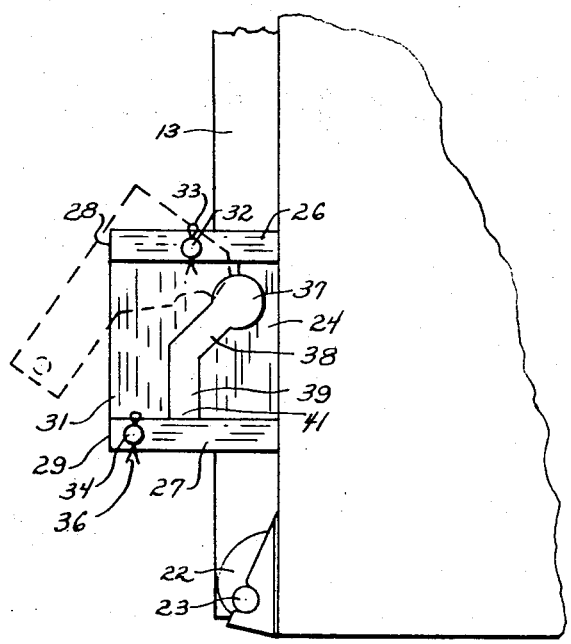
FIG. 2 is an enlarged side elevational view of a typical embodiment of the present invention, the major portions of the dump body and tail gate being broken away to conserve space in the drawing.

Referring now to FIG. 2, wherein the dump bed is shown in its normal level attitude, the tail gate release hook 22 is shown holding the tail gate in the closed position by engagement of the hook 22 with the bar 23 of the gate.

The chain holder assembly includes a plate 24 welded to the rear of the tail gate. At the upper and lower margins of the plate and on each side thereof there are straps 26 and 27, respectively welded thereto and extending to the point 28 for the upper straps and 29 for the lower straps. A plate 31 is pinned to the upper straps 26 by a clevis pin 32 retained in position by a cotter pin 23. The lower end of the plate 32 is pinned to the straps 27 by a clevis pin 34 retained by a cotter pin 36.

The plates 24 and 31 form a slot having a large circular upper end 37 through which a chain assembly 16 can be readily pulled. Then there is the downwardly inclined portion 38 and the vertical portion 39 terminating at the lower end of the slot 41. Although the portion 37 is large enough to pull the chain through readily, the portions 38 and 39 are narrow enough to accommodate only the thickness of the chain stock but not the width of a link, so once a chain link is slided down in this slot, the chain cannot be pulled either direction transverse to the plane of the plates 24 and 31.

Assuming that the dump body is tipped upwardly for dumping the load, the chain becomes tight as shown in FIG. 1. If some portion of the load becomes lodged in the tail gate opening 42, to wholly or partially prevent even distribution of the load, the dump body can be lowered. Usually the blockage will not remedy itself or dislodge itself by such action so it will likely be necessary to open the tail gate further. For this purpose it is desired to remove the chain from the slot.

Because of the load still remaining on the tail gate by the material wedged in the opening, it is difficult to remove the chain. According to the present invention, however, the cotter pin 36 is removed from the clevis pin 34 and the latter is removed from the aligned apertures in plate 31 and straps 27. The plate can then be pulled out to a position such as shown by the dotted outline in FIG. 2 whereupon the chain will easily fall out of the way, one margin of the slot having been completely removed.

Figure 3:
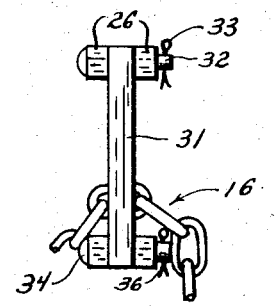
FIG. 3 is a rear elevational view of the embodiment of FIG. 2.
Figure 4:
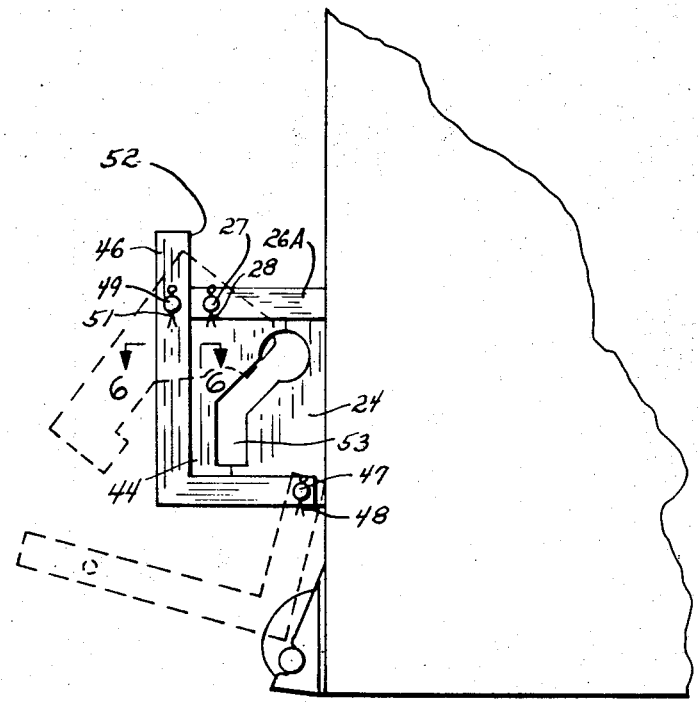
FIG. 4 is a side elevational view like FIG. 2, but showing a modified version and deleting the tail gate, to avoid confusion in the drawing.
Figure 5:
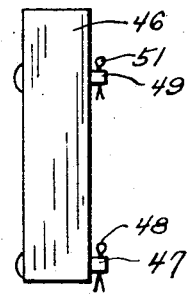
FIG. 5 is a rear elevational view of the embodiment of FIG. 4.
Figure 6:
FIG. 6 is a section taken at line 6—6 in FIG. 4 and viewed in the direction of the arrows.

Referring now to FIGS. 4 through 6, the plate 24 can be the same as described above with reference to FIGS. 2 and 3, so is given the same reference numeral. The rear plate can also be the same as described above, but it is slightly different in the illustrated embodiment and is given the reference numeral 44. A retainer assembly 46 is pivotally mounted to the plate 24 at the clevis pins 47 which is retained in place by cotter pin 48. The upper portion of retainer 46 is secured in the plate 44 by a clevis pin 49 retained by cotter pin 51. The plate 44 is pivotally mounted to the straps 26A at the clevis pin 27 secured in place by the cotter pin 28.

In this embodiment of the invention, the retainer as better shown in FIG. 6 is channel shaped and normally holds the plate 44 in the position shown in FIG. 4 to provide a slot of the same general configuration as described above. It thereby assures that the chain slot will securely hold the chain at all times except when release is desired.

To release the chain slot from its normal configuration, the cotter pin 51 is removed and the clevis pin 49 is removed. The upstanding end portion 52 of the retainer 46 makes it easy to pull backwardly thereon by gripping it with the hand. The distance between this portion and the pin 47 provides a good mechanical advantage with respect to the pivot making it easy to pull the retainer down to the position shown by the dotted outline. Then the plate 44 can readily move out to the position shown by the dotted outline therefor so that the chain can fall from the slot 53 and release the tail gate.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. The combination comprising:
first and second holder means pivotally connected together and having a slot therein,
a portion of said slot being sized to admit the thickness of a chain link, but sized less than the width of a link, to preclude passage therethrough of a link oriented transverse to the slot,
said first holder means forming one margin of said slot, and said second holder means forming another margin of said slot,
said slot having an enlargement therein spaced from one end a distance greater than the said width of a chain link and sized to receive adjacent chain links freely therethrough to permit passage of a chain therethrough,
and said slot having an offset portion entering into said enlargement.
2. The combination of claim 1 wherein:
said slot extends upwardly from a lower end and said enlargement in said slot is at the upper end and the pivotal connection of said first and second holder means is closer to said upper end of said slot than to the lower end of said slot.
3. The combination comprising:
first and second holder means pivotally connected together and having a slot therein,
a portion of said slot being sized to admit the thickness of a chain link, but sized less than the width of a link, to preclude passage therethrough of a link oriented transverse to the slot,
said first holder means forming one margin of said slot, and said second holder means forming another margin of said slot,
said slot having an enlargement therein spaced from one end a distance greater than the said width of a chain link and sized to receive adjacent chain links freely therethrough to permit passage of a chain therethrough,
said first holder being mountable to a container, with said slot extending generally vertically;
said second holder means being further connected to said first holder means by a pin adjacent to a lower end of said slot, to normally maintain constant the size and shape of said slot, said pin being removable to permit pivoting said second holder means on said first holder means and thereby open up the lower portion of said slot to facilitate removal of chain therefrom.
4. The combination comprising:
first and second holder means pivotally connected together and having a slot therein,
a portion of said slot being sized to admit the thickness of a chain link, but sized less than the width of a link, to preclude passage therethrough of a link oriented transverse to the slot,
said first holder means forming one margin of said slot, and said second holder means forming another margin of said slot;
a vehicle dump body having a tail gate thereon;
a spreader chain associated with said gate;
gate release means on said body and normally holding the lower portion of said gate closed against said body;
said first holder means being affixed to said body beside said tail gate,
a portion of said chain being received and retained in said portion of said slot, said slot having an enlarged portion above the first mentioned portion to permit insertion therethrough of successive chain links oriented transverse to each other.
5. The combination comprising:
first and second holder means pivotally connected together and having a slot therein,
a portion of said slot being sized to admit the thickness of a chain link but sized less than the width of a link, to preclude passage therethrough of a link oriented transverse to the slot,
said first holder means forming one margin of said slot, and said second holder means forming another margin of said slot,
said slot having an enlargement therein spaced from one end a distance greater than the said width of a chain link and sized to receive adjacent chain links freely therethrough to permit passage of a chain therethrough,
a retainer pivotally mounted to said first holder means and normally fastened to one of said holder means to prevent pivoting of said retainer, said retainer normally retaining said second holder means from pivoting with respect to said first holder means.

6. The combination of claim 5 wherein:

said retainer is an L shaped member having a channel section portion receiving a portion of said second holder means therein.

7. The combination of claim 5 wherein:

a clevis pin secures said retainer to said second holder means adjacent the pivotal connection of said second holder means to said first holder means, and said retainer has a handle portion remote from the pivotal axis of said retainer to said first holder means to facilitate movement thereof to a position releasing said second holder means.

References Cited

UNITED STATES PATENTS

| | | | |
|---|---|---|---|
| 1,280,163 | 10/1918 | Clarkson | 24—116 |
| 2,908,529 | 10/1959 | Davidson | 298—38 |
| 2,967,056 | 1/1961 | D'Amato | 298—7 |

FOREIGN PATENTS 20,879   1/1916   Denmark.

BANJAMIN HERSH, Primary Examiner

JOHN A. PEKAR, Assistant Examiner

U.S. Cl. X.R.

24—116; 292—264